US012393221B2

(12) United States Patent
Tsuguma

(10) Patent No.: US 12,393,221 B2
(45) Date of Patent: Aug. 19, 2025

(54) OPERATION PEDAL DEVICE FOR VEHICLE

(71) Applicant: TOYODA IRON WORKS CO., LTD., Toyota (JP)

(72) Inventor: Tomohiro Tsuguma, Toyota (JP)

(73) Assignee: TOYODA IRON WORKS CO., LTD., Toyota (JP)

( * ) Notice: Subject to any disclaimer, the term of this patent is extended or adjusted under 35 U.S.C. 154(b) by 0 days.

(21) Appl. No.: 18/846,274

(22) PCT Filed: Jun. 2, 2023

(86) PCT No.: PCT/JP2023/020622
§ 371 (c)(1),
(2) Date: Sep. 12, 2024

(87) PCT Pub. No.: WO2023/238787
PCT Pub. Date: Dec. 14, 2023

(65) Prior Publication Data
US 2025/0103083 A1    Mar. 27, 2025

(30) Foreign Application Priority Data
Jun. 7, 2022 (JP) ................................. 2022-092267

(51) Int. Cl.
*G05G 1/30* (2008.04)
*B60T 7/04* (2006.01)
(Continued)

(52) U.S. Cl.
CPC .............. *G05G 1/323* (2013.01); *B60T 7/065* (2013.01)

(58) Field of Classification Search
CPC ............ G05G 1/30; G05G 1/32; G05G 1/323; G05G 1/327; G05G 1/44; B60T 7/065
See application file for complete search history.

(56) References Cited

U.S. PATENT DOCUMENTS 5,970,817 A * 10/1999 Ichiba ...................... G05G 1/46
74/513
6,176,340 B1 * 1/2001 Mizuma .................. B60T 7/065
180/274
(Continued)

FOREIGN PATENT DOCUMENTS

| CN | 105905084 A | 8/2016 |
| JP | H11198776 A | 7/1999 |

(Continued)

OTHER PUBLICATIONS

First Office Action dated Apr. 19, 2025 issued in the Chinese Patent Application No. 202380036653.2 with English machine translation.

*Primary Examiner* — Adam D Rogers

(57) ABSTRACT

A vehicle operation pedal device includes a pedal bracket, an operation pedal, a rotation lever, and a shear portion. The rotation lever includes a contact portion and a pressing portion. The rotation lever is configured to, by receiving a load greater than or equal to a threshold when the contact portion comes into contact with the vehicle body structural member, rotate about the rotation shaft such that the pressing portion presses the input shaft. The shear portion is configured to fix the rotation lever to the pedal arm when the load applied to the rotation lever from the vehicle body structural member is less than the threshold, and cancel the fixation by being broken when the load is greater than or equal to the threshold.

4 Claims, 9 Drawing Sheets

(51) Int. Cl.
*B60T 7/06* (2006.01)
*G05G 1/323* (2008.04)

(56) References Cited

U.S. PATENT DOCUMENTS

| | | | | |
|---|---|---|---|---|
| 6,178,846 | B1 * | 1/2001 | Specht | G05G 1/327 |
| | | | | 74/513 |
| 6,279,417 | B1 * | 8/2001 | Mizuma | B60T 7/065 |
| | | | | 180/274 |
| 6,655,489 | B2 * | 12/2003 | Kawai | B60T 7/065 |
| | | | | 180/274 |
| 9,376,094 | B2 * | 6/2016 | Kitano | B60T 7/065 |
| 2001/0027696 | A1 | 10/2001 | Mizuma et al. | |
| 2016/0244033 | A1 | 8/2016 | Uchida et al. | |

FOREIGN PATENT DOCUMENTS

| | | | | |
|---|---|---|---|---|
| JP | 2005231547 | A | | 9/2005 |
| JP | 2012128659 | A | * | 7/2012 |
| JP | 2015072504 | A | | 4/2015 |
| JP | 2017024584 | A | | 2/2017 |
| JP | 2017199199 | A | * | 11/2017 |
| KR | 20080048279 | A | * | 6/2008 |
| KR | 20080053619 | A | * | 6/2008 |

* cited by examiner

OPERATION PEDAL DEVICE FOR VEHICLE

CROSS-REFERENCE TO RELATED APPLICATIONS

This application is national stage application of International Application No. PCT/JP2023/020622, filed on Jun. 2, 2023, which claims the benefit of priority from Japanese Patent Application No. 2022-092267, filed on Jun. 7, 2022, the entire contents of each of which are incorporated herein by reference.

TECHNICAL FIELD

The present disclosure relates to a vehicle operation pedal device.

BACKGROUND ART

Vehicles such as automobiles are equipped with vehicle operation pedal devices used in brake devices, clutch devices, or the like. For instance, Patent Literature 1 discloses a brake pedal device 100 used in a brake device of a related art shown in FIG. 20. The brake pedal device 100 includes a pedal bracket 101 and a brake pedal 103 as its basic structure. The pedal bracket 101 is fixed to the dash panel 102. The brake pedal 103 includes a brake arm 104 rotatably supported by the pedal bracket 101. The brake pedal device 100 actuates a brake booster 105 by moving a push rod 106, which is the input shaft of the brake booster 105, in conjunction with rotation of the brake arm 104.

The brake pedal device 100 further includes a mechanism (rearward movement reduction mechanism), which reduces rearward movement of the brake pedal 103 (hereinafter, referred to as "rearward movement") when an impact is applied to a vehicle body 108 from the front due to a collision of the vehicle. The rearward movement reduction mechanism includes a connecting arm 107, a rotation arm 110, and a rivet shaft 116.

The connecting arm 107 is rotatably supported by the pedal bracket 101. The connecting arm 107 connects the push rod 106 and the brake arm 104 to each other. The rotation arm 110 includes a first link 111, which is rotatably supported by the connecting arm 107 via a first connecting shaft 112, and a second link 113, which is rotatably supported by the connecting arm 107 via a second connecting shaft 114. The first link 111 and the second link 113 are connected to each other by a third connecting shaft 115. The rivet shaft 116 is inserted through the first link 111, the second link 113, and the connecting arm 107.

With the above-described brake pedal device 100, the dash panel 102 moves rearward together with the brake pedal device 100 during a collision of the vehicle. The first link 111 comes into contact with an instrument panel reinforcement 117, which is a vehicle body structural member disposed rearward of the dash panel 102. When the first link 111 receives a load exceeding a threshold from the instrument panel reinforcement 117 due to this contact, the rivet shaft 116 breaks due to shearing or similar forms of stress. This allows both the first link 111 and the second link 113 to be rotatable relative to the connecting arm 107. Rotation of the first link 111 is transmitted to the second link 113 via the third connecting shaft 115. When rotating relative to the connecting arm 107, the second link 113 presses the push rod 106 from below. This pressing action bends the push rod 106, causing the brake pedal 103 to move forward.

CITATION LIST

Patent Literature

Patent Literature 1: Japanese Laid-Open Patent Publication No. 2015-72504

SUMMARY OF INVENTION

Technical Problem

However, in the brake pedal device 100 of the related art, in which the push rod 106 is connected to the connecting arm 107, the following issues may arise during non-collision situations of the vehicle. If the connecting arm 107 is deformed or if the push rod 106 is disconnected from the connecting arm 107, it becomes difficult to push the push rod 106 when the brake pedal 103 is depressed. This leads to difficulties in achieving a stable pedal operation.

The above-described issue is not limited to the brake pedal device 100, but can commonly occur in any vehicle operation pedal device that moves the input shaft of a device to which depression force of an operation pedal is transmitted.

Solution to Problem

In one general aspect of the present disclosure, a vehicle operation pedal device employed in a vehicle includes a partition wall that partitions a passenger compartment from a portion of a vehicle body forward of the passenger compartment, and a vehicle body structural member disposed behind the partition wall. The vehicle operation pedal device includes a pedal bracket fixed to the partition wall, an operation pedal, a rotation lever, and a shear portion. The operation pedal includes a pedal arm rotatably supported by the pedal bracket. An input shaft of a device to which a depression force of the operation pedal is transmitted is connected to the pedal arm. The operation pedal is configured such that the input shaft is moved in conjunction with rotation of the pedal arm. The rotation lever includes a contact portion and a pressing portion, is supported by the pedal arm via a rotation shaft, and is configured to, by receiving a load greater than or equal to a threshold when the contact portion comes into contact with the vehicle body structural member at a collision of the vehicle, rotate about the rotation shaft such that the pressing portion presses the input shaft in a direction intersecting with an axis of the input shaft. The shear portion is configured to fix the rotation lever to the pedal arm when the load applied to the rotation lever from the vehicle body structural member is less than the threshold. The shear portion is also configured to cancel the fixation by being broken when the load is greater than or equal to the threshold.

DESCRIPTION OF EMBODIMENTS

A brake pedal device, which is an example of a vehicle operation pedal device, will now be described with reference to FIGS. 1 to 11.

In the following description, the direction in which a vehicle 10 advances forward will be referred to as the front, and the reverse direction will be referred to as the rear. The vertical direction refers to the vertical direction of the vehicle 10, and the lateral direction refers to the vehicle width direction that corresponds with the lateral direction when the vehicle 10 is advancing forward.

Figure 1:
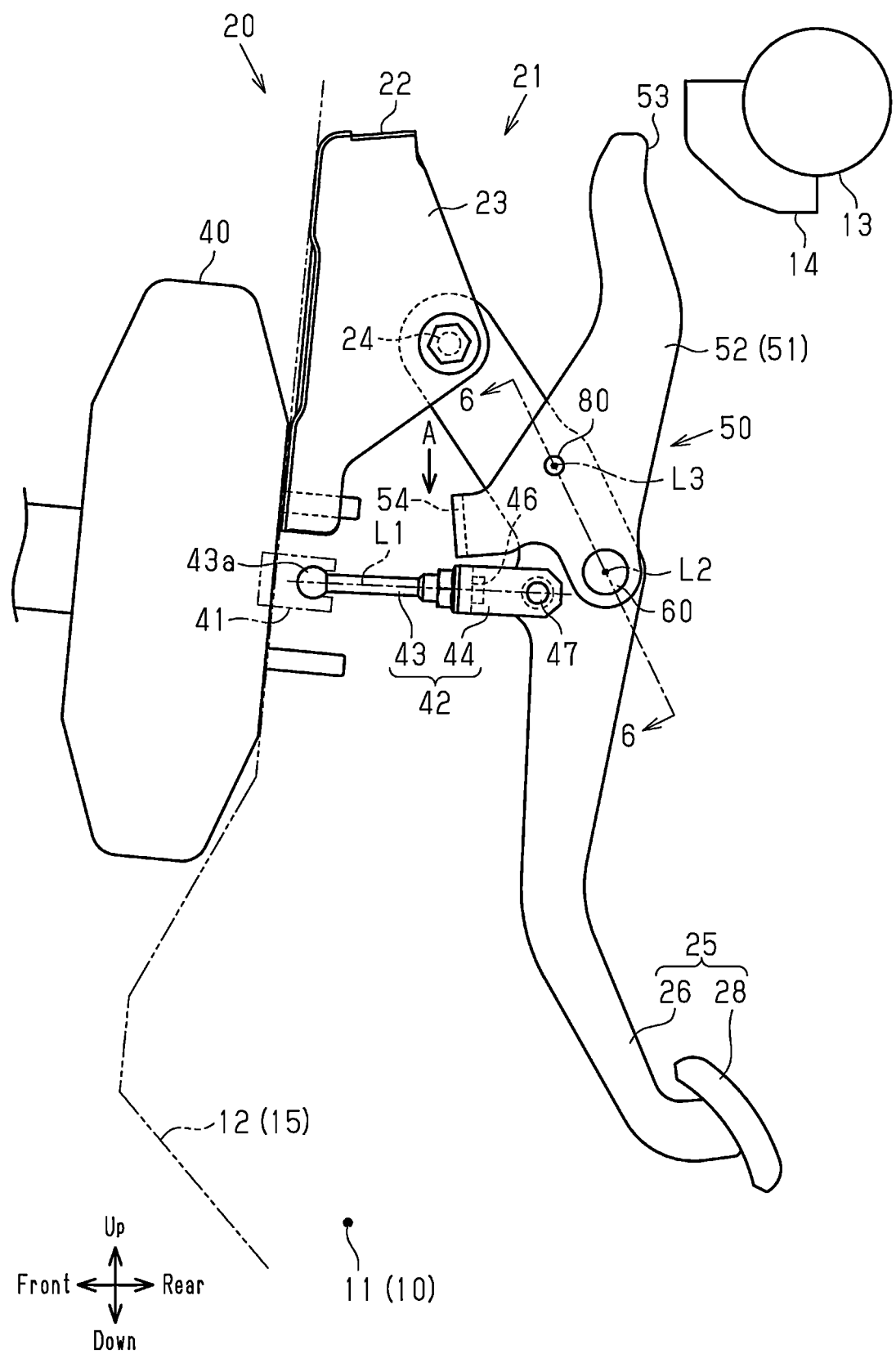
FIG. 1 is a side view of a brake pedal device according to an embodiment together with a brake booster.

As shown in FIG. 1, the vehicle 10 includes a dash panel 12, which is a partition wall. The dash panel 12 separates a passenger compartment 11 from a portion of a vehicle body 15 forward of the passenger compartment 11; for example, an engine compartment. An instrument panel reinforcement 13 and a collision bracket 14, which are vehicle body structural members, are disposed rearward of the dash panel 12. The instrument panel reinforcement 13 is a pipe-shaped member extending in the lateral direction to reinforce the vehicle body 15. The collision bracket 14 is fixed to a front lower portion of the instrument panel reinforcement 13.

Basic Structure of Brake Device 20

The vehicle 10 is provided with a brake device 20 that applies a braking force to wheels (not shown). The brake device 20 includes a brake pedal device 21 and a brake booster 40, which is a booster device.

Figure 3:
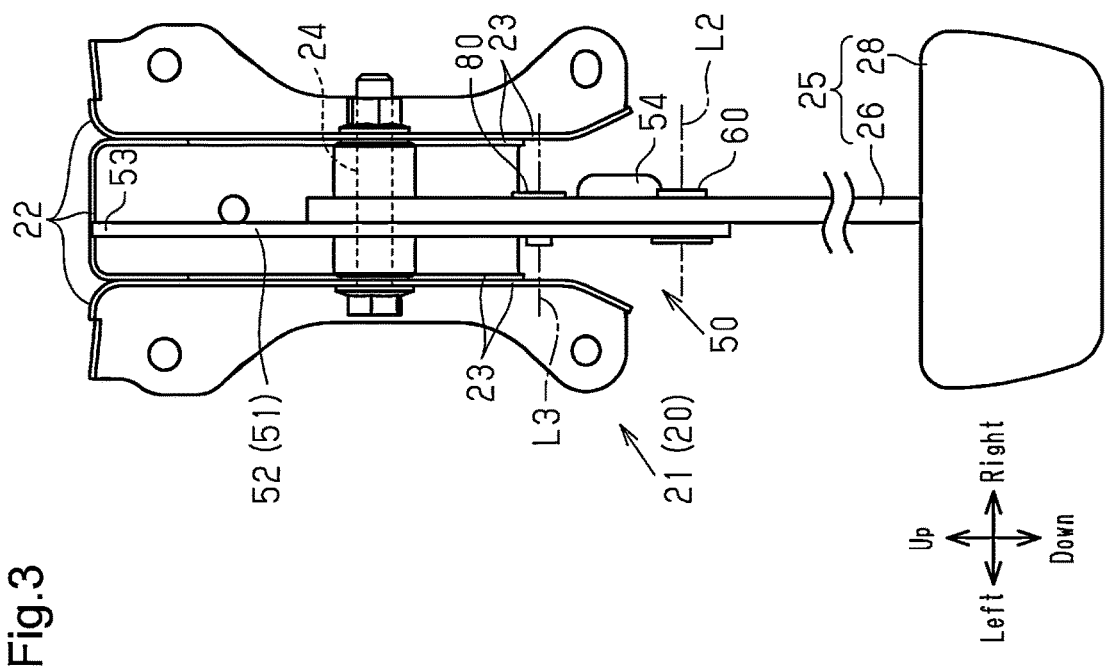
FIG. 3 is a partial front view of the brake pedal device shown in FIG. 2 in a state in which a part of a pedal arm is omitted.
Figure 2:
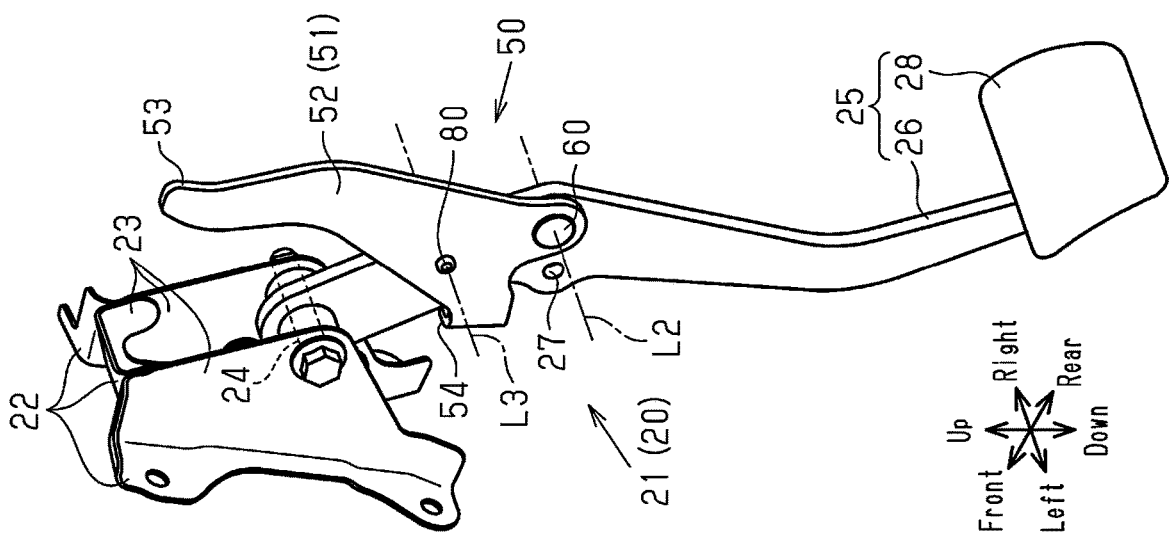
FIG. 2 is a perspective view of the brake pedal device shown in FIG. 1.

As shown in FIGS. 1 to 3, the brake pedal device 21 includes a pedal bracket 22 and an operation pedal 25. The pedal bracket 22 is fixed directly to the dash panel 12 or to a separate member attached to the dash panel 12. The pedal bracket 22 includes two side plate portions 23 disposed in parallel to each other in a state of being spaced apart from each other in the lateral direction. An operation shaft 24 extends between the two side plate portions 23.

The operation pedal 25 includes a pedal arm 26 and a pedal pad 28. The pedal arm 26 is formed from a metal plate. The pedal arm 26 is shaped to be longer in the vertical direction than in the front-rear direction. The pedal arm 26 is rotatably supported by the pedal bracket 22 at its upper end via the operation shaft 24. The pedal pad 28 is a portion to be depressed by the driver, and is fixed to the lower end of the pedal arm 26.

Figure 4:
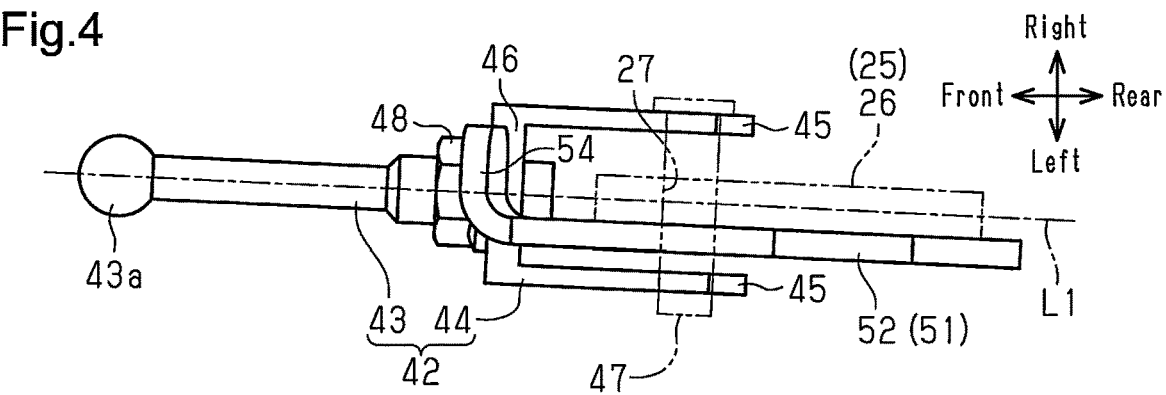
FIG. 4 is a plan view as seen from the direction of arrow A in FIG. 1.

As shown in FIG. 1, the brake booster 40 (booster device) is an example of a device to which the depression force of the operation pedal 25 is transmitted. The brake booster 40 is configured to reduce the amount of depression force applied to the operation pedal 25, and includes a plunger 41 and an input shaft 42. The plunger 41 is movable in the front-rear direction. The input shaft 42 includes a push rod 43 and a clevis 44. An axis L1 of the push rod 43 extends in the front-rear direction and agrees with the axis of the input shaft 42. The push rod 43 has a ball portion 43a at the front end. The ball portion 43a is engaged with the plunger 41. The push rod 43 is swingable relative to the plunger 41 about the ball portion 43a. As shown in FIG. 4, the clevis 44 includes two side plates 45 arranged parallel to each other with a gap between them in the lateral direction. The clevis 44 also includes a connecting plate 46, which links the front ends of the side plates 45. In a top view, the clevis 44 forms a U-shape. A connecting pin 47 extends between rear end portions of the side plates 45. A central portion of the connecting plate 46 in the lateral direction is fixed to the rear end of the push rod 43. This fixation is achieved using fastening members 48 such as a bolt and a nut. Through this fixation, the push rod 43 and the clevis 44 are integrated as a single unit.

As shown in FIG. 1, the brake pedal device 21 actuates the brake booster 40 by moving (pushing) the input shaft 42 in conjunction with rotation of the pedal arm 26.

The brake pedal device 21 further includes a rearward movement reduction mechanism 50, which includes a rotation lever 51, a rotation shaft 60, and a shear portion 80. The axis L2 of the rotation shaft 60 and the axis L3 of the shear portion 80 both extend in the lateral direction. In the present embodiment, the pedal arm 26 has the same or similar external shape as a pedal arm used in a brake pedal device (not shown) that does not include the rearward movement reduction mechanism 50. No significant changes have been made to the shape of the pedal arm due to the addition of the rearward movement reduction mechanism 50.

Rotation Lever 51

Figure 6:
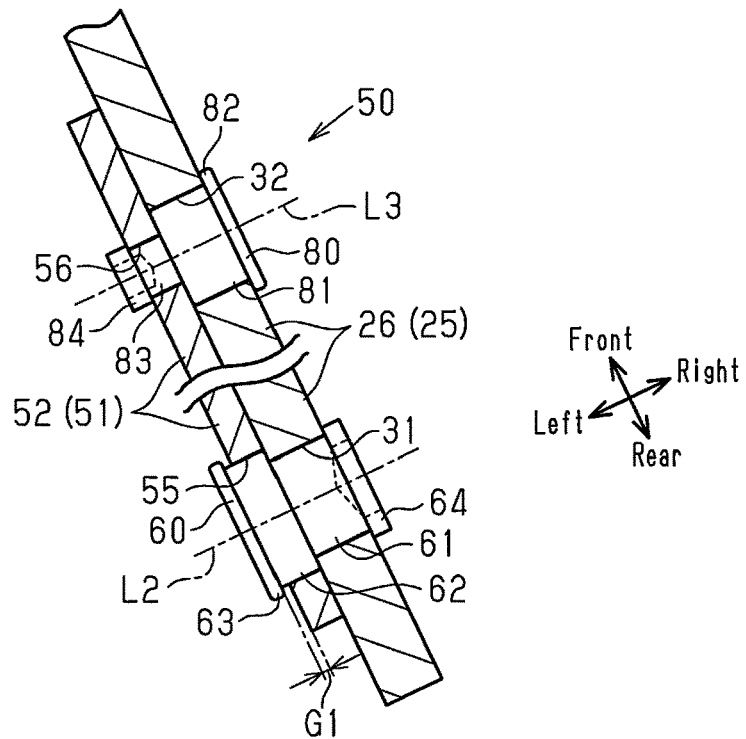
FIG. 6 is a partial cross-sectional view taken along line 6-6 in FIG. 1.

As shown in FIGS. 2 and 6, the rotation lever 51 is made of metal such as iron and is formed of a plate having a thickness smaller than that of the pedal arm 26. The lateral direction, which is a direction along the axis L2 of the rotation shaft 60, is a thickness direction of the rotation lever 51. The core structure of the rotation lever 51 is a plate-shaped lever main body 52, which is longer in the vertical direction than in the front-rear direction. As shown in FIGS. 1 and 2, the upper end of the lever main body 52 is positioned at about the same height as an intermediate portion of the collision bracket 14 in the vertical direction. The front lower end of the lever main body 52 is located below the operation shaft 24. The lever main body 52 is disposed in a state of being overlapped with one side in the thickness direction of the pedal arm 26, that is, on the left side in the present embodiment, but may be disposed in a state of being overlapped with the right side.

The rotation lever 51 further includes a contact portion 53 and a pressing portion 54. The contact portion 53 is formed on the rear surface of the upper end of the lever main body 52 at a position forward of the collision bracket 14.

As shown in FIGS. 2 and 4, the pressing portion 54 protrudes from the front edge of the front lower end of the lever main body 52 toward the pedal arm 26 in the thickness direction of the lever main body 52. In this example, the pressing portion 54 protrudes rightward. The pressing portion 54 has the shape of a plate that extends vertically. The pressing portion 54 has a lateral dimension larger than the thickness of the lever main body 52. In the present embodiment, the dimension of the pressing portion 54 in the lateral direction is set to a dimension close to the distance between the side plates 45 of the clevis 44. The pressing portion 54 is formed integrally with the lever main body 52 by bending the front lower end of the plate used to form the lever main body 52.

As shown in FIGS. 1 and 4, the pressing portion 54 is disposed below the instrument panel reinforcement 13 and the collision bracket 14 and above the input shaft 42. In addition, the pressing portion 54 is disposed such that an intermediate portion thereof in the lateral direction is located above the axis L1.

The rotation lever 51 is supported by the pedal arm 26 via the rotation shaft 60 at a rear lower end of the lever main body 52, the rear lower end being different from the contact portion 53 and the pressing portion 54.

The rotation lever 51 rotates about the rotation shaft 60 so that the pressing portion 54 presses the connecting plate 46 in a direction intersecting with (in the present embodiment, orthogonal to) the axis L1 when the following condition is met. The condition is that the rotation lever 51 receives a load greater than or equal to a predetermined threshold from the collision bracket 14 when the contact portion 53 comes into contact with the collision bracket 14 due to a collision of the vehicle 10.

As shown in FIG. 6, in order for the rotation lever 51 to be supported by the pedal arm 26 via the rotation shaft 60, an arm hole 31 is formed in the pedal arm 26 at a position rearward of the input shaft 42. A lever hole 55 having a larger diameter than the arm hole 31 is formed in the lever main body 52 at a position rearward of the input shaft 42.

Rotation Shaft 60

The rotation shaft 60 is a metal stepped pin that includes a small diameter portion 61, a large diameter portion 62, and a flange 63. The small diameter portion 61 is fitted into the arm hole 31. An end of the small diameter portion 61 on the side farther from the lever main body 52 (on the right side) is exposed from the arm hole 31. An upset portion 64, which is larger in the radial direction than the small diameter portion 61, is formed at the exposed end by upsetting the end. The large diameter portion 62 has a larger diameter than the small diameter portion 61 and is fitted into the lever hole 55. The small diameter portion 61 is fixed to the pedal arm 26 by sandwiching the pedal arm 26 from the left and right sides by the large diameter portion 62 and the upset portion 64. An end of the large diameter portion 62 on the side farther from the pedal arm 26 (on the left side) is exposed from the lever hole 55. The flange 63 is formed at the end of the large diameter portion 62, and has a larger diameter than the lever hole 55. The flange 63 is separated from the lever main body 52 in a direction away from the pedal arm 26 (to the left side) by a gap G1. The rotation shaft 60 has the shear strength to withstand the load received by the rotation lever 51 from the collision bracket 14 during a collision of the vehicle 10 without breaking.

Shear Portion 80

The shear portion 80 has a function similar to that of what is generally called a shear pin. Specifically, the shear portion 80 fixes the rotation lever 51 to the pedal arm 26 when the load applied to the rotation lever 51 from the collision bracket 14 is less than the threshold. When the load applied to the rotation lever 51 is greater than or equal to the threshold, the shear portion 80 is broken to cancel the fixation. The fixation by the shear portion 80 refers to restriction of rotation of the rotation lever 51 about the rotation shaft 60 with respect to the pedal arm 26. This fixation includes not only a state in which the rotation lever 51 cannot move in the thickness direction of the rotation lever 51 with respect to the pedal arm 26, but also a state in which the rotation lever 51 can move in that direction.

In order to allow the shear portion 80 to exhibit the above-described functionality, an arm hole 32 is formed in the pedal arm 26 by pressing at a position obliquely forward and upward with respect to the arm hole 31. A lever hole 56 having a smaller diameter than the arm hole 32 is formed in the lever main body 52 at a position obliquely forward and upward with respect to the lever hole 55.

The shear portion 80 is a metal stepped pin including a large diameter portion 81, a flange 82, and a small diameter portion 83. The large diameter portion 81 is fitted into the arm hole 32. An end of the large diameter portion 81 on the side farther from the lever main body 52 (on the right side) is exposed from the arm hole 32. The flange 82 is formed at the end of the large diameter portion 81 and has a diameter larger than that of the arm hole 32.

The small diameter portion 83 has a smaller diameter than the large diameter portion 81 and is fitted into the lever hole 56. The small diameter portion 83 is formed to have a diameter smaller than that of the small diameter portion 61 of the rotation shaft 60. By setting the diameters as described above, the shear strength of the shear portion 80 is set to be smaller than the shear strength of the rotation shaft 60. An end of the small diameter portion 83 on the side farther from the pedal arm 26 (on the left side) is exposed from the lever hole 56. An upset portion 84, which is larger in the radial direction than the small diameter portion 83, is formed at the exposed end by upsetting the end.

From the perspective of ensuring that the shear portion 80 breaks during a collision of the vehicle 10, it is preferable to use, as the shear portion 80, a straight pin having a relatively small diameter in the large diameter portion 81 as well as in the small diameter portion 83. This would require the diameter of the arm hole 32 to be relatively small like the diameter of the lever hole 56. Nevertheless, the diameter of the arm hole 32 is made larger than the diameter of the lever hole 56, and a stepped pin is used for the following reason. As described above, the thickness of the pedal arm 26 is greater than the thickness of the lever main body 52. If an arm hole 32 with a small diameter, similar to the lever hole 56, were formed in the relatively thick pedal arm 26, it would be necessary to perform machining (formation of a pilot hole, reaming, chamfering). This would increase the cost of formation.

In contrast, forming the arm hole 32 through pressing can be done at a lower cost than machining, leading to a reduction in the overall cost of the structure that fixes the rotation lever 51 using the shear portion 80.

Further, in the present embodiment, as shown in FIGS. 1 and 4, the input shaft 42 of the brake booster 40 is connected to the pedal arm 26. Specifically, the pedal arm 26 includes a clevis hole 27 in a part of the front portion, in the present embodiment, at a position forward of the rotation shaft 60 (arm hole 31). The clevis hole 27 and its peripheral portion of the pedal arm 26 are disposed between the side plates 45 of the clevis 44. As described above, the connecting pin 47 extending between the side plates 45 is inserted into the clevis hole 27. The push rod 43 is connected to the pedal arm 26 by the clevis 44 and the connecting pin 47.

Operation of the above-described present embodiment will now be described.

Non-Collision State of Vehicle 10

FIG. 1 shows the brake pedal device 21 when the vehicle 10 is not in a collision, and the operation pedal 25 is not being depressed by the driver. The contact portion 53 of the rotation lever 51 is separated forward from the collision bracket 14. The shear portion 80 fixes the rotation lever 51 to the pedal arm 26 together with the rotation shaft 60 in a state in which the position of the rotation lever 51 is determined in the rotation direction around the rotation shaft 60. The pressing portion 54 is separated upward from the connecting plate 46.

Figure 7:
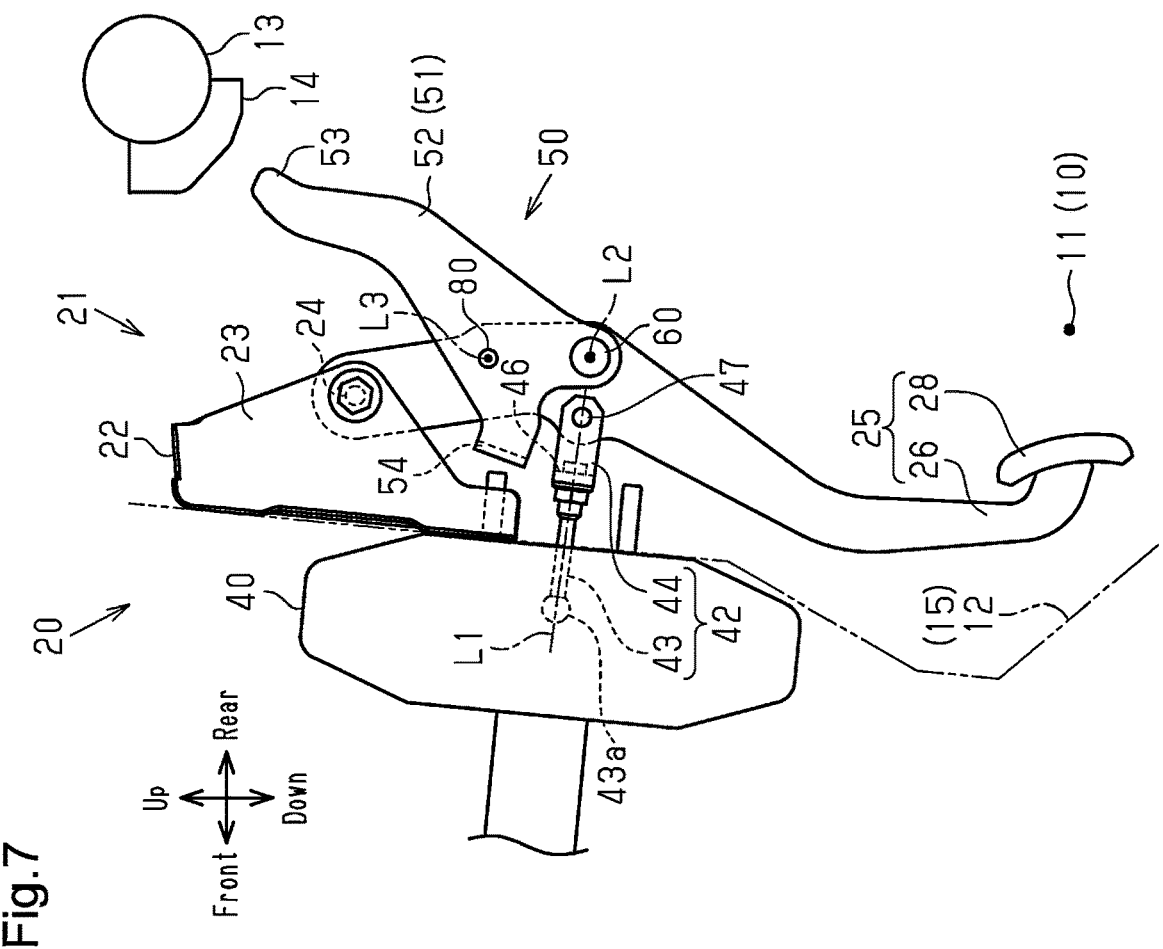
FIG. 7 is a partial side view of the brake pedal device together with the brake booster, in which an operation pedal is depressed from the state shown in FIG. 1.

FIG. 7 shows the brake pedal device 21 when the vehicle 10 is not in a collision, and the operation pedal 25 is being depressed by the driver, applying force to the pedal pad 28. During this depression operation, the operation pedal 25 rotates forward around the operation shaft 24. This rotation is transmitted to the push rod 43 via the connecting pin 47 and the clevis 44. The push rod 43 is moved (pushed forward) so as to actuate the brake booster 40. The shear portion 80 fixes the rotation lever 51 to the pedal arm 26 together with the rotation shaft 60. Therefore, the rotation lever 51 moves integrally with the operation pedal 25 around the operation shaft 24 at a position away from the collision bracket 14. The pressing portion 54 is separated obliquely rearward and upward from the connecting plate 46.

Collision State of Vehicle 10

From the state shown in FIG. 1, when an external force (impact) is applied to the vehicle body 15 from the front due to a collision of the vehicle 10, the dash panel 12 moves rearward together with the brake pedal device 21. This reduces the distance between the dash panel 12 and the collision bracket 14. When the rotation lever 51 comes into contact with the collision bracket 14 at the contact portion 53, the rotation lever 51 receives a load (reaction force) from the collision bracket 14. This load acts on the rotation shaft 60 and the shear portion 80.

When the load received by the rotation lever 51 from the collision bracket 14 is greater than or equal to the threshold, the shear portion 80 is broken (cut) due to shearing or similar forms of stress. The rotation shaft 60 is not broken. The fixation of the rotation lever 51 to the pedal arm 26 by the shear portion 80 is cancelled. This allows the rotation lever 51 to rotate around the rotation shaft 60 with respect to the pedal arm 26.

Figure 8:
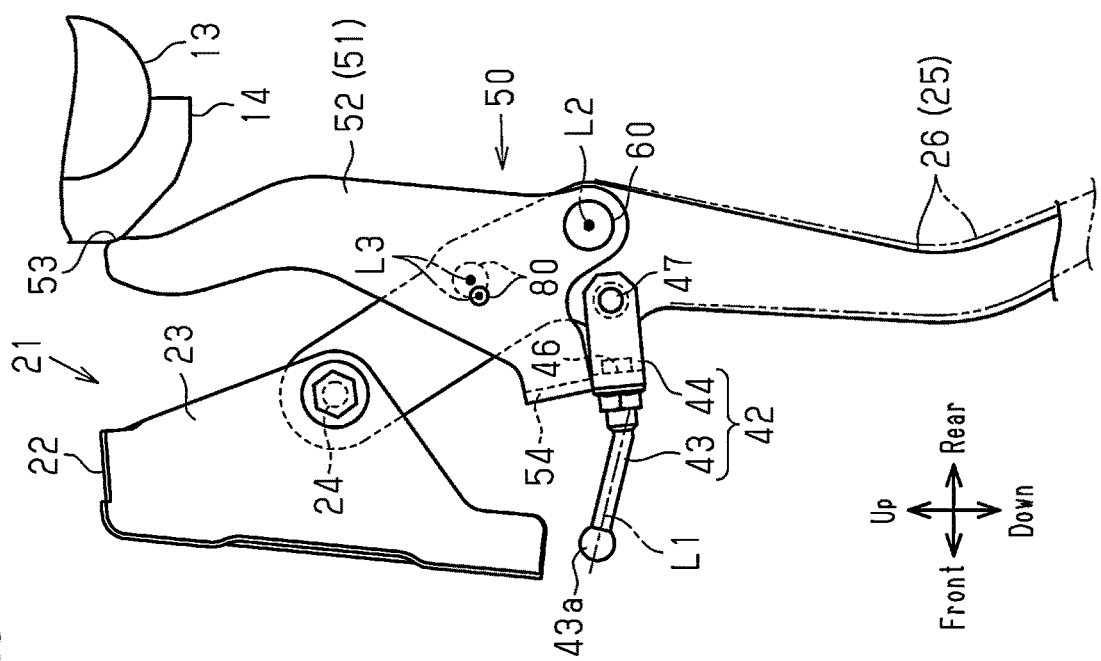
FIG. 8 is a partial side view of the brake pedal device according to the embodiment of FIG. 1, in which an input shaft is being bent by a pressing portion at the time of collision of the vehicle.
Figure 9:
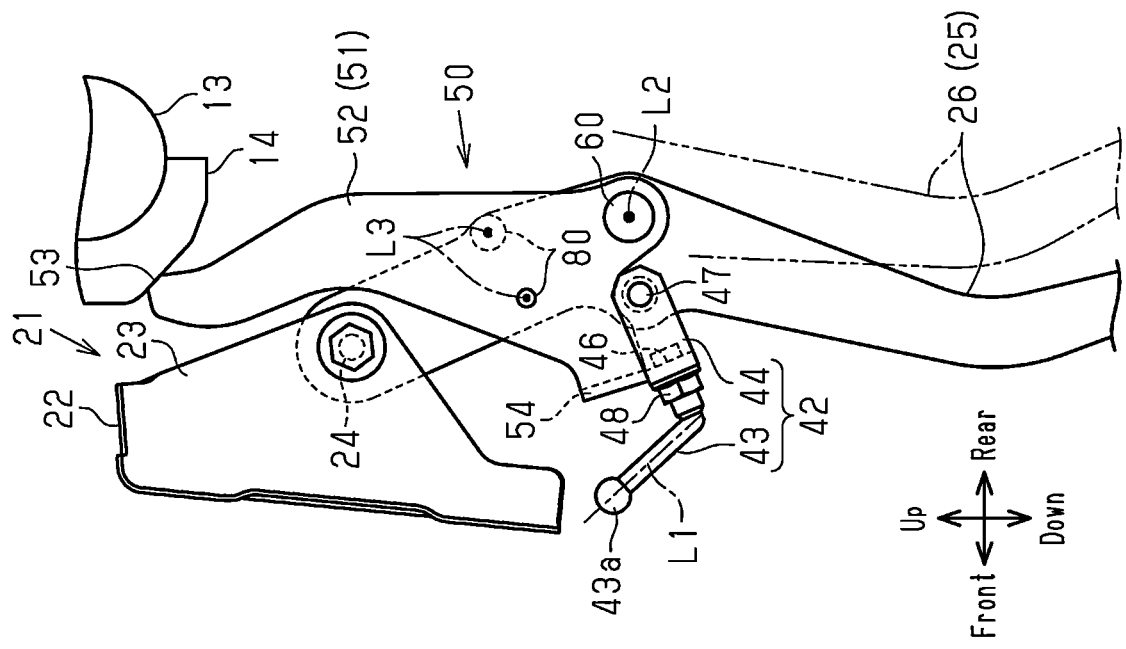
FIG. 9 is a partial side view of the brake pedal device according to the embodiment of FIG. 1, in which the input shaft is further bent from the state of FIG. 8.

The rotation lever 51 rotates forward, and the pressing portion 54 comes into contact with the connecting plate 46 from above. As shown in FIGS. 8 and 9, the pressing portion 54 presses the connecting plate 46 downward in a direction intersecting with the axis L1 of the push rod 43 (a direction orthogonal to the axis L1 in the present embodiment). This pressing action bends the input shaft 42 downward. Due to the bending action, the operation pedal 25, in particular, the pedal pad 28, moves forward, which is the direction of depression of the pedal pad 28. In FIGS. 8 and 9, the pedal arm 26 indicated by the long-dash double-short-dash lines indicates the position of the pedal arm 26 before the collision of the vehicle 10. In this manner, the rearward movement of the operation pedal 25 at the time of collision of the vehicle 10 is reduced.

The present embodiment has the following advantages.

Figure 20:
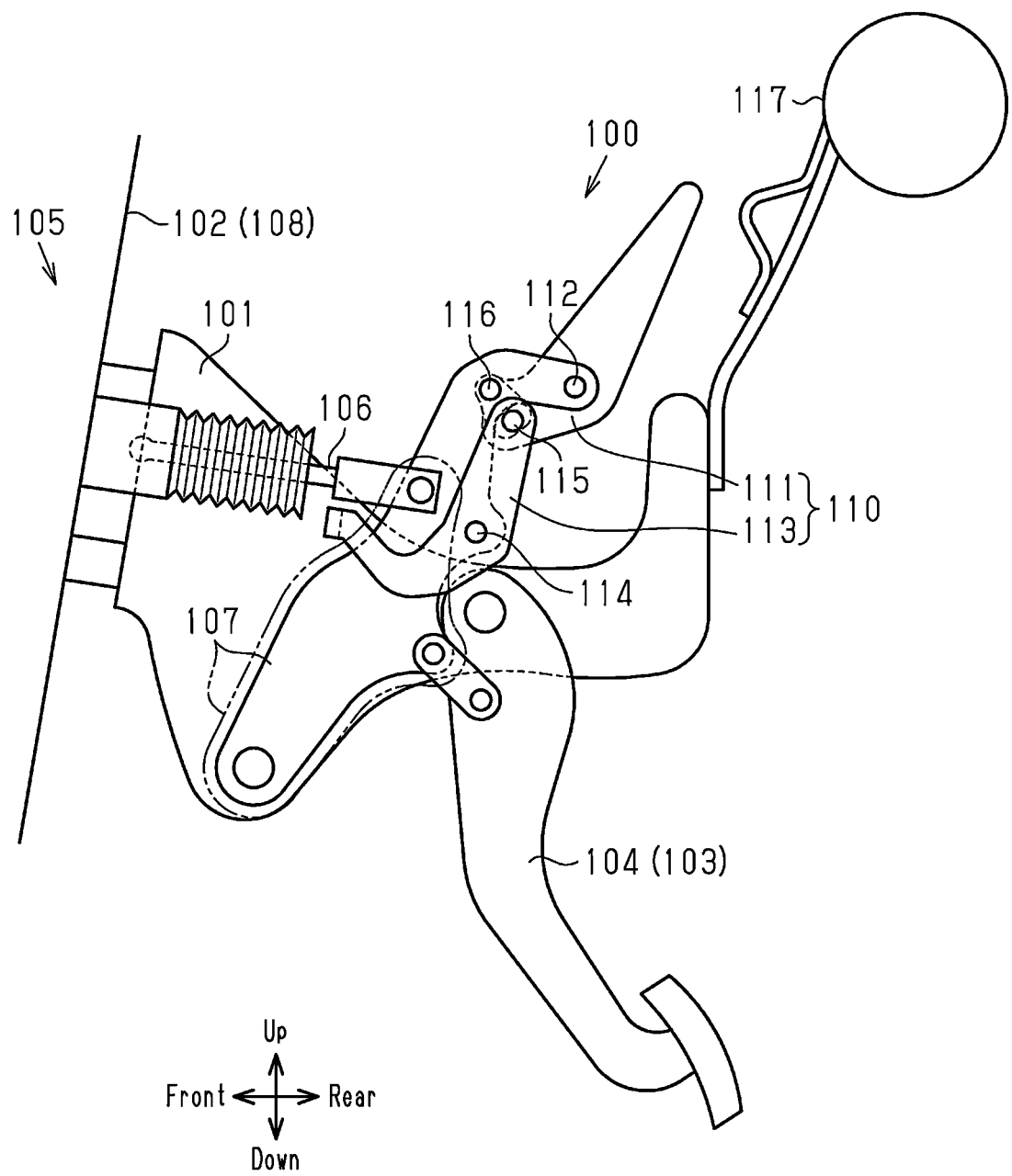
FIG. 20 is a side view showing a brake pedal device of a related art.

(1) In the present embodiment, the input shaft 42 of the brake booster 40 is connected to the pedal arm 26 as shown in FIG. 1. The phenomenon in which the push rod 106 connected to the connecting arm 107 of the related art shown in FIG. 20 is detached from the connecting arm 107 does not occur in the present embodiment. Further, as shown in FIG. 1, in the present embodiment, even if the rotation lever 51 is deformed, the connection state of the input shaft 42 to the pedal arm 26 is not affected. Therefore, in a non-collision state of the vehicle 10, the input shaft 42 can be stably moved (pushed) in conjunction with rotation of the pedal arm 26 regardless of the state of the rotation lever 51 in the present embodiment. In a non-collision state of the vehicle 10, the brake booster 40 can be actuated by stably performing the depression operation of the operation pedal 25 similarly to the brake pedal device not provided with a rearward movement reduction mechanism.

(2) If the vehicle body structural members (the instrument panel reinforcement 13 and the collision bracket 14) were positioned at the same height as in the present embodiment, the advantage of item (1) would also be obtained by pressing the input shaft 42 from below with the pressing portion 54. In this case, however, since the pressing portion 54 would need to be located below the input shaft 42, the rotation lever 51 would have a complicated shape and be increased in size. In this regard, in the present embodiment, the pressing portion 54 is disposed below the vehicle body structural member (the collision bracket 14) and above the input shaft 42 as shown in FIG. 1. Therefore, the input shaft 42 can be pressed from above by the pressing portion 54, allowing the rotation lever 51 to have a simple shape and reduced size.

(3) When the shear portion 80 is broken upon a collision of the vehicle 10, the rotation lever 51 becomes rotatable relative to the pedal arm 26 as described above. In this situation, if the flange 63 of the rotation shaft 60 is in contact with the lever main body 52, the rotation lever 51 may resist rotation due to sliding resistance between the flange 63 and the lever main body 52. In this regard, in the present embodiment, the small diameter portion 61 is fixed to the pedal arm 26 by sandwiching the pedal arm 26 from both left and right sides by the large diameter portion 62 and the upset portion 64 as shown in FIG. 6. In this state, the flange 63 is separated from the lever main body 52 by the gap G1. By setting the gap G1, the sliding resistance between the flange 63 and the lever main body 52 is reduced, allowing the rotation lever 51 to rotate smoothly. This improves the rearward movement reduction performance of the rearward movement reduction mechanism 50.

(4) In the present embodiment, the pressing portion 54 has the shape of a plate extending in the vertical direction as shown in FIGS. 1 to 4. This configuration increases the strength of the pressing portion 54 in the vertical direction, which is the bending direction of the input shaft 42. The pressing portion 54 is thus prevented from being deformed when the input shaft 42 is bent. By designing the shape of the rotation lever 51 in this manner, the strength in the vertical direction of the pressing portion 54 is increased. Thus, there is no need to add separate components for the same purpose.

Figure 5:
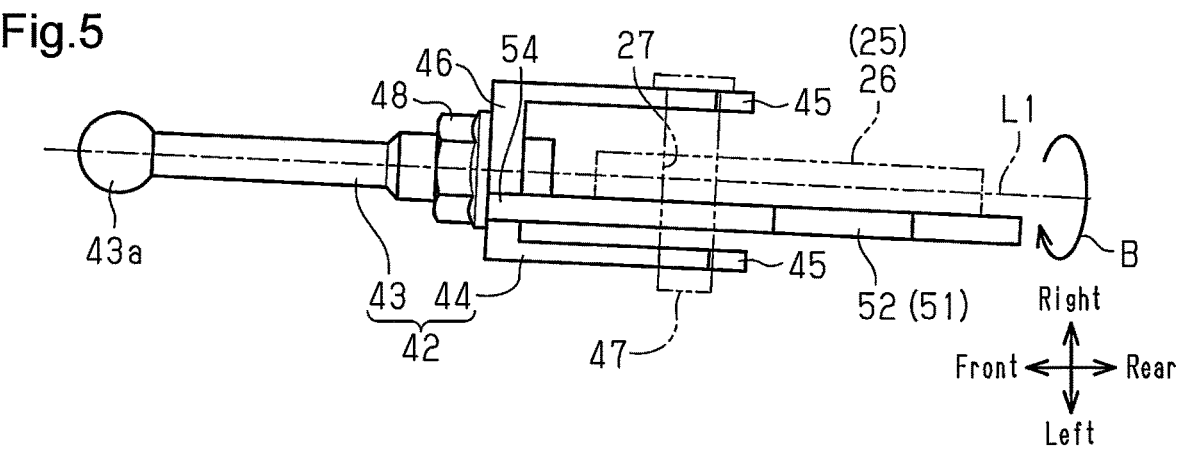
FIG. 5 is a plan view corresponding to FIG. 4, showing a comparative example.

(5) As shown in FIG. 5, a part of the front end of the lever main body 52 that is parallel to the axis L1 of the push rod 43 may be used as the pressing portion 54. In this case, the dimension of the pressing portion 54 in the lateral direction is the same as the thickness of the lever main body 52. The contact area of the pressing portion 54 with the connecting plate 46 is relatively small. The input shaft 42 is swingable about the ball portion 43a. Thus, if the pressing portion 54 presses the connecting plate 46 at a position deviated from the axis L1 in the lateral direction, the following concern arises. When that deviated position of the connecting plate 46 is pressed by the small contact area of the pressing portion 54, a force is generated that attempts to rotate the input shaft 42 around the axis L1, as indicated by arrow B. The pressing portion 54 presses the connecting plate 46 downward in a state in which the balance in the lateral direction is disrupted. In other words, the pressing force of the pressing portions 54 is used to rotate the input shaft 42 about the axis L1. Accordingly, the pressing force used to bend the input shaft 42 is reduced, and the bending efficiency may thus be reduced.

In this regard, in the present embodiment, the dimension of the pressing portion 54 in the lateral direction is larger than the thickness of the lever main body 52 as shown in FIG. 4. The contact area of the pressing portion 54 with the connecting plate 46 is larger than that of the comparative example of FIG. 5. The pressing portion 54 presses the connecting plate 46 downward in a state in which the balance in the lateral direction is maintained. This restricts rotation of the input shaft 42 about the axis L1. The pressing force of the pressing portion 54 is less likely to be used to rotate the input shaft 42 about the axis L1. The pressing force of the pressing portion 54 is predominantly used to bend the input shaft 42, thereby preventing a reduction in bending efficiency. This allows for stable bending of the input shaft 42.

It is possible to increase the contact area with the connecting plate 46 by adding another component to the rotation lever 51. However, this would increase the number of components. In the present embodiment, since the pressing portion 54, which is a part of the rotation lever 51, has a large contact area with the connecting plate 46, it is not necessary to add another component.

(6) In the present embodiment, the pressing portion 54 is formed by bending a portion (front end) of the plate used to form the lever main body 52 as shown in FIG. 4. In other words, the pressing portion 54 is formed integrally with the lever main body 52. Therefore, a separate member for forming the pressing portion 54 is unnecessary.

(7) The rearward movement reduction mechanism of the related art shown in FIG. 20 includes the connecting arm 107, the first link 111, the second link 113, the first connecting shaft 112, the second connecting shaft 114, the third connecting shaft 115, and the rivet shaft 116. The number of parts forming the rearward movement reduction mechanism is large. In particular, there are many shafts for rotation (the first connecting shaft 112 and the second connecting shaft 114). Therefore, the cost of components and the cost required for assembly increase, and the rearward movement reduction mechanism is relatively large in size.

In contrast, in the present embodiment, the rearward movement reduction mechanism 50 includes a smaller number of components, including the rotation lever 51, the rotation shaft 60, and the shear portion 80 as shown in FIG. 1. There is only one shaft for rotation (the rotation shaft 60). Further, the lever main body 52, the contact portion 53, and the pressing portion 54 are formed as a single component. This configuration reduces the cost of components and the cost required for assembly. Furthermore, the compact design of the rearward movement reduction mechanism 50 allows for space-saving optimization.

(8) The rearward movement reduction mechanism 50 is capable of adjusting the load applied from the collision bracket 14 to the contact portion 53 and the force with which the pressing portion 54 bends the input shaft 42 during a collision of the vehicle 10, by changing the position of at least one of the rotation shaft 60 or the shear portion 80.

Figure 10:
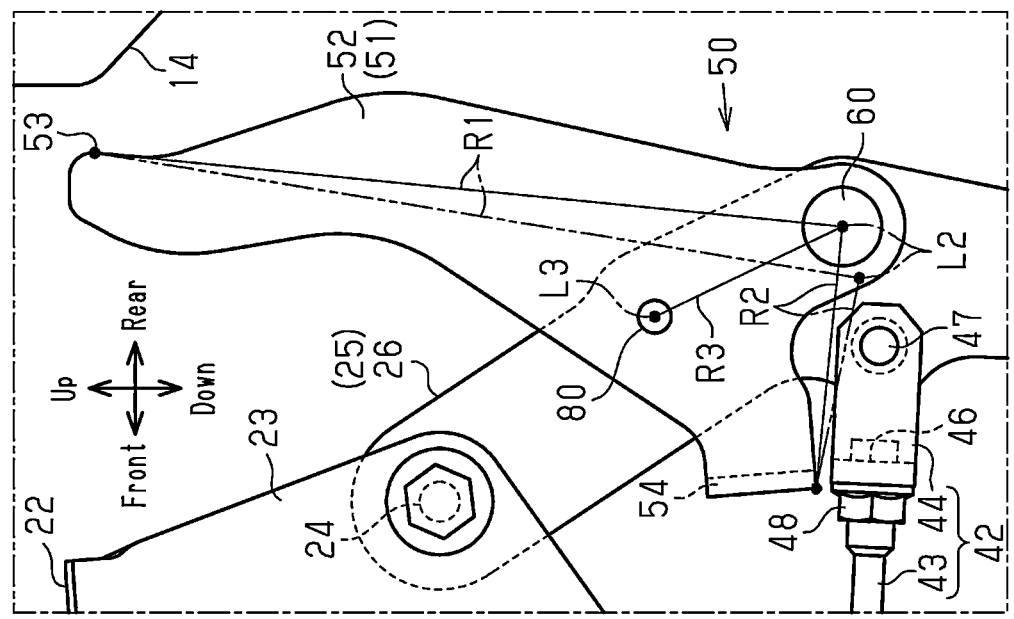
FIG. 10 is a partial side view illustrating a lever ratio in the brake pedal device shown in FIG. 1.
Figure 11:
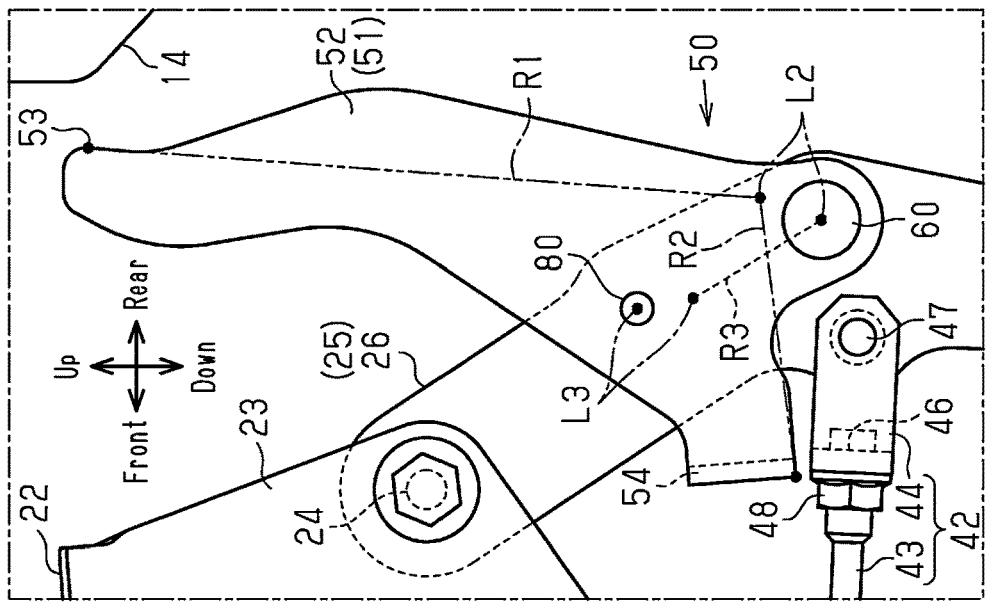
FIG. 11 is a partial side view illustrating a lever ratio in the brake pedal device shown in FIG. 1.

As shown in FIGS. 10 and 11, the distance from the axis L2 of the rotation shaft 60 to the contact portion 53 is defined as R1. The distance from the axis L2 to the contact point of the pressing portion 54 with the connecting plate 46 is defined as R2. The distance from the axis L2 to the axis L3 of the shear portion 80 is defined as R3. Distances R1 to R3 indicated by solid lines in FIG. 10 indicate the distances R1 to R3 in the rearward movement reduction mechanism 50 of the present embodiment.

The ratio of the distance R1 to the distance R2 (R1/R2) is referred to as a bending lever ratio. By changing the position of the rotation shaft 60, at least one of the distances R1 and R2 is changed, and the bending lever ratio (R1/R2) is changed.

By increasing the bending lever ratio (R1/R2), the load applied to the contact portion 53 is reduced. For example, when the position of the rotation shaft 60 is changed obliquely forward and downward, the distance R1 becomes longer and the distance R2 becomes shorter than those in the present embodiment as indicated by the long-dash double-short-dash lines in FIG. 10. Accordingly, the bending lever ratio (R1/R2) increases as compared to that of the present embodiment, and the load applied to the contact portion 53 decreases.

Conversely, by decreasing the bending lever ratio (R1/R2), the amount by which the pressing portion 54 bends the input shaft 42 is increased, enhancing the rearward movement reduction effect. For example, when the position of the rotation shaft 60 is changed obliquely rearward and upward, the distance R1 becomes shorter and the distance R2 becomes longer than those in the present embodiment as indicated by the long-dash double-short-dash lines in FIG. 11. Accordingly, the bending lever ratio (R1/R2) decreases as compared to that of the present embodiment, and the amount by which the pressing portion 54 bends the input shaft 42 increases.

Further, as shown in FIGS. 10 and 11, the ratio of the distance R1 to the distance R3 (R1/R3) is defined as a shear lever ratio. By changing the position of at least one of the rotation shaft 60 and the shear portion 80, the distances R1 and R3 are changed, so that the shear lever ratio is changed (R1/R3).

By increasing the shear lever ratio (R1/R3), the load applied to the contact portion 53 is reduced. For example, when the position of the shear portion 80 is changed downward, the distance R3 becomes shorter than that in the present embodiment as indicated by the broken lines in FIG. 11. Accordingly, the shear lever ratio (R1/R3) increases as compared to that of the present embodiment, and the load applied to the contact portion 53 decreases.

The rearward movement reduction mechanism 50 of the present embodiment uses only one rotation shaft 60 as a shaft for rotation as shown in FIG. 1. Therefore, in the present embodiment, it is easy to design the positions of the rotation shaft 60 and the shear portion 80. Consequently, it is easy to achieve the optimal settings needed to meet the target values for the rearward movement reduction performance required for the rearward movement reduction mechanism 50 in each vehicle 10. Moreover, the operation of each component of the rearward movement reduction mechanism 50 is unlikely to be overly complex.

The rearward movement reduction mechanism of the related art shown in FIG. 20 can also adopt a similar lever ratio design as the present embodiment. However, the mechanism of the related art uses multiple members (the first connecting shaft 112 and the second connecting shaft 114) as shafts for rotation. Therefore, complex design requirements are imposed, making the design process difficult. Moreover, the operation of each component of the rearward movement reduction mechanism is overly complex.

(9) As shown in FIGS. 1 and 6, the pedal arm 26 of the present embodiment has the same or a similar external shape as the pedal arm in a brake pedal device (not shown) that does not include the rearward movement reduction mechanism 50. The shape of the pedal arm has not been significantly altered for the formation of the arm holes 31, 32. Therefore, the size of the pedal arm 26 is not increased due to the addition of the rearward movement reduction mechanism 50.

In contrast, in the related art configuration shown in FIG. 20, the brake arm 104 and the connecting arm 107 connected to the brake arm 104 correspond to the pedal arm 26 of the present embodiment. If the brake pedal device 100 of the related art did not include the rearward movement reduction mechanism, the connecting arm 107 would have a shape indicated by the long-dash double-short-dash lines in FIG. 20. In order to form portions through which the first connecting shaft 112, the second connecting shaft 114, and the rivet shaft 116 are respectively inserted, the connecting arm 107 would need to be expanded upward as shown by the solid lines in FIG. 20. Of the brake arm 104 and the connecting arm 107, which correspond to the pedal arm 26 of the present embodiment, the size of the connecting arm 107 is increased.

The above-described embodiment may be modified as follows. The above-described embodiment and the following modifications can be combined as long as the combined modifications remain technically consistent with each other.

Modifications to Rotation Lever 51

Figure 19:
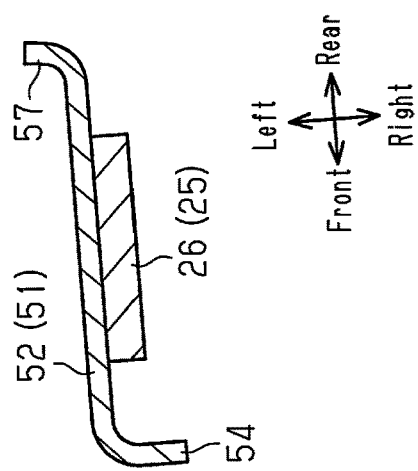
FIG. 19 is a cross-sectional view taken along line 19-19 in FIG. 18.
Figure 18:
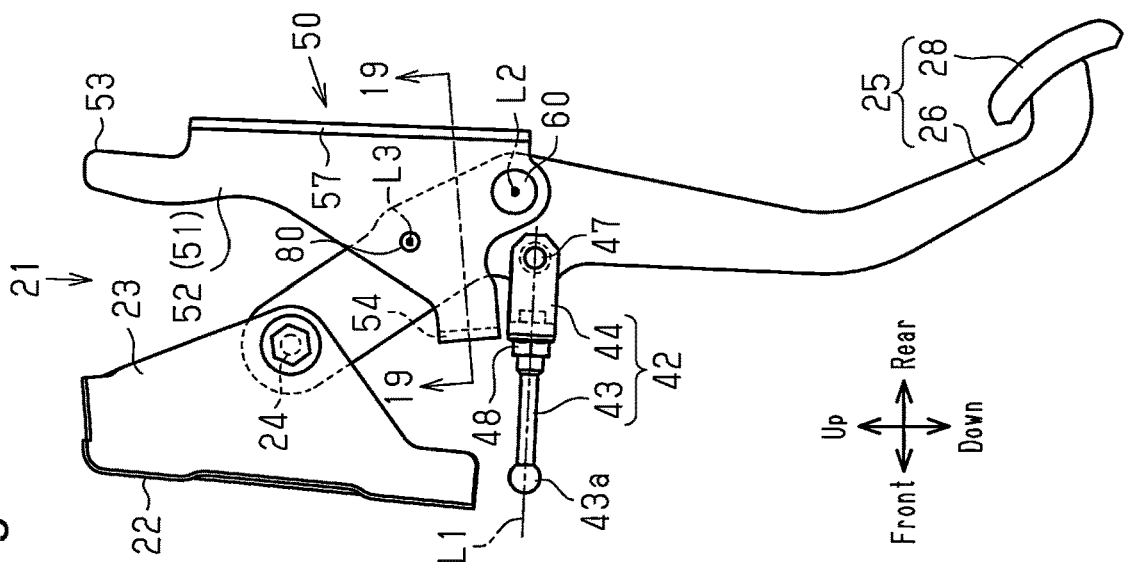
FIG. 18 is a side view showing a brake pedal device according to modification in which a rib is formed on a rotation lever.

In a case in which the lever main body 52 is a plate longer in the vertical direction than in the front-rear direction as shown in FIGS. 18 and 19, a rib 57 extending in the vertical direction may be formed along the rear edge of the lever main body 52. The rib 57 is formed by bending a plate used for forming the lever main body 52 toward one side in the thickness direction, that is, toward the left side in FIGS. 18 and 19. The formation of the rib 57 increases the stiffness of the rotation lever 51. This configuration prevents the rotation lever 51 from being deformed or tilted in the lateral direction even if the rotation lever 51 receives a large load from the collision bracket 14. Additionally, the configuration prevents the rotation lever 51 from being deformed due to the reaction force from the input shaft 42 when the input shaft 42 is bent by the pressing portion 54. Moreover, it is not necessary to add separate components to increase the stiffness of the lever main body 52, which reduces the cost of the rotation lever 51.

The rib 57 may be formed to extend vertically along the front edge of the lever main body 52 instead of or in addition to the rear edge. The rib 57 may also be formed as a separate member from the lever main body 52.

As shown in FIG. 5, a part of the lever main body 52 parallel to the axis L1 of the push rod 43 may be the pressing portion 54. If the pressing portion 54 protrudes to the left or right from the lever main body 52, the dimension in the lateral direction of the pressing portion 54 may be changed to be larger or smaller than that of the above-described embodiment.

The location at which the pressing portion 54 presses the clevis 44 may be changed to a location different from the connecting plate 46. Further, the location at which the pressing portion 54 presses the input shaft 42 may be changed to a location different from the clevis 44.

At least one of the contact portion 53 and the pressing portion 54 may be formed by a member separate from the lever main body 52.

The pressing portion 54 may press the input shaft 42 in a direction obliquely intersecting with the axis L1.

Modifications to Rotation Shaft 60 and Shear Portion 80

As shown in FIGS. 12 to 17, the rotation shaft 60 and the shear portion 80 may be changed to those having configurations different from those of the above-described embodiment.

Figure 12:
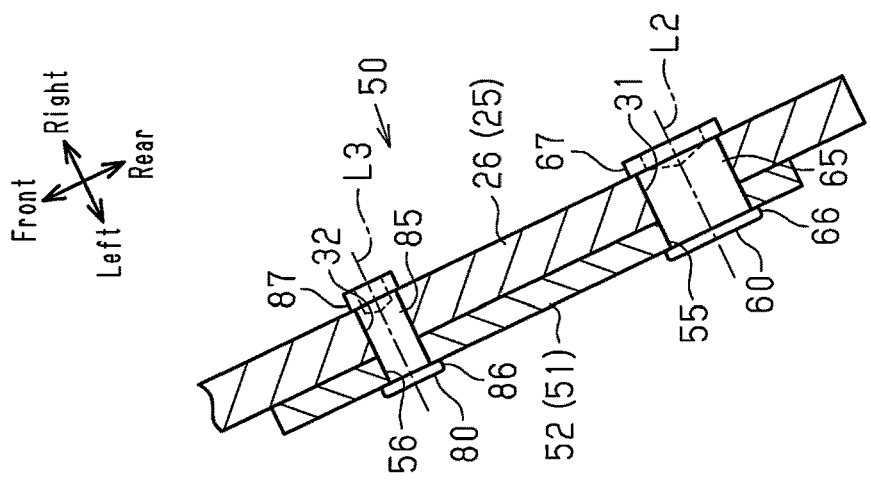
FIG. 12 is a partial cross-sectional view corresponding to FIG. 6, showing a rotation shaft and a shear portion according to a first modification.

In a first modification shown in FIG. 12, the arm hole 31 and the lever hole 55 are formed to have the same diameter. The rotation shaft 60 may be a metal straight pin that is fitted into the arm hole 31 and the lever hole 55 and includes a shaft 65 having a uniform diameter and a flange 66. In this case, an end of the shaft 65 on the side farther from the pedal arm 26 (on the left side) is exposed from the lever hole 55. The flange 66 is formed at the exposed end, and has a larger diameter than the lever hole 55. An end of the shaft 65 on the side farther from the lever main body 52 (on the right side) is exposed from the arm hole 31. An upset portion 67, which is larger in the radial direction than the shaft 65, is formed at the exposed end by upsetting the end.

Similarly to the above-described embodiment, the rotation shaft 60 fixes the rotation lever 51 to the pedal arm 26 together with the shear portion 80 in a non-collision state of the vehicle 10, and serves as the center of rotation of the rotation lever 51 at the time of collision. This also applies to the rotation shaft 60 in each of the modifications shown in FIGS. 13 to 17.

In the first modification shown in FIG. 12, the arm hole 32 and the lever hole 56 are formed to have the same diameter. The shear portion 80 may be a metal straight pin that is fitted into the arm hole 32 and the lever hole 56 and includes a shaft 85 having a uniform diameter and a flange 86. In this case, an end of the shaft 85 on the side farther from the pedal arm 26 (on the left side) is exposed from the lever hole 56.

The flange 86 is formed at the exposed end, and has a larger diameter than the lever hole 56. An end of the shaft 85 on the side farther from the lever main body 52 (on the right side) is exposed from the arm hole 32. An upset portion 87, which is larger in the radial direction than the shaft 85, is formed at the exposed end by upsetting the end.

Similarly to the above-described embodiment, in a non-collision state of the vehicle 10, the shear portion 80 fixes the rotation lever 51 to the pedal arm 26 together with the rotation shaft 60 in a state in which the position of the rotation lever 51 is determined in the rotation direction around the rotation shaft 60. This also applies to each of the modifications shown in FIGS. 13 to 15.

Figure 13:
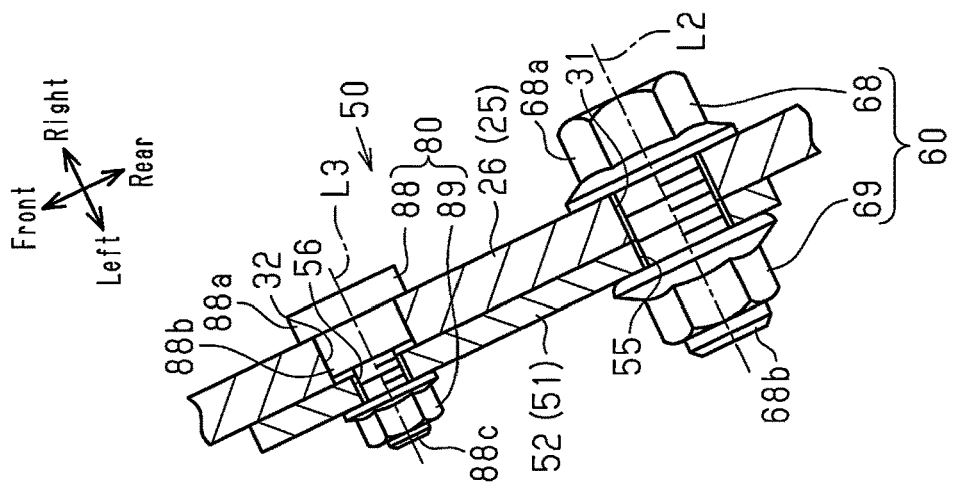
FIG. 13 is a partial cross-sectional view corresponding to FIG. 6, showing a rotation shaft and a shear portion according to a second modification.

As in a second modification shown in FIG. 13, the rotation shaft 60 may be formed by a combination of a nut 69 and a bolt 68 including a head 68a and a shaft 68b. In this case, the arm hole 31 and the lever hole 55 are formed to have the same diameter. The shaft 68b is inserted through the arm hole 31 and the lever hole 55. The head 68a may be disposed on the opposite side (right side) of the pedal arm 26 from the lever main body 52, or may be disposed on the opposite side (left side) of the lever main body 52 from the pedal arm 26. The nut 69 is fastened to an end of the shaft 68b on the side opposite to the head 68a.

In the rotation shaft 60 of the second modification, the distance between the nut 69 and the head 68a of the bolt 68 can be changed. Therefore, even when multiple types of pedal arms 26 having different thicknesses are used, the rotation shaft 60 can be applied to each of the pedal arms 26. By fastening the bolts 68 and the nuts 69, the difference in thickness can be absorbed, and the manufacturing cost will be reduced.

Figure 14:
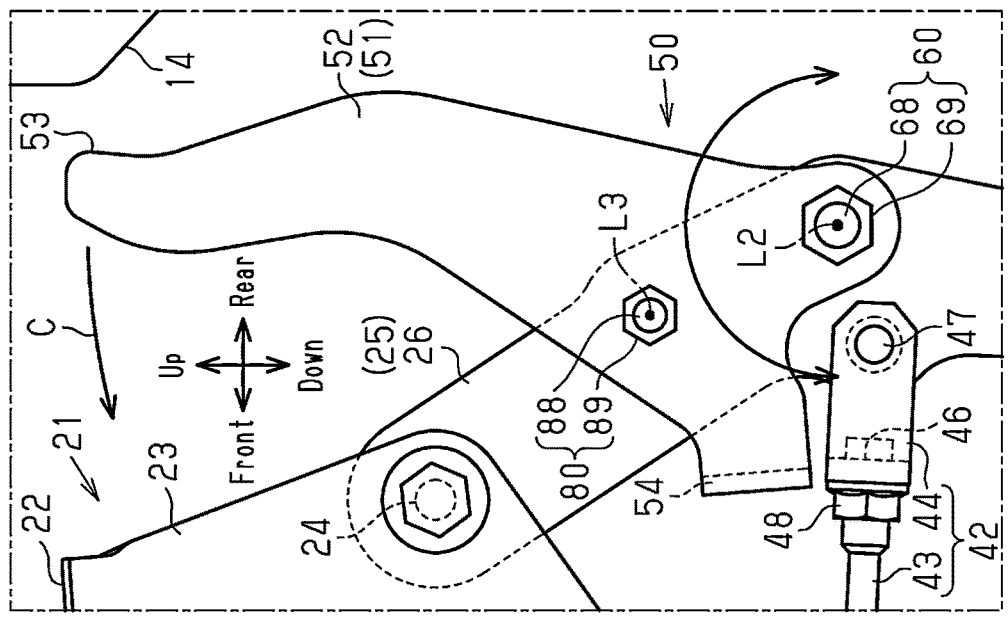
FIG. 14 is a partial side view of a brake pedal device, illustrating advantages of the second modification shown in FIG. 13.

Further, the modification is expected to provide the following advantages. Since, as shown in FIG. 14, the rotational direction in which the nut 69 is loosened is the same as the rotational direction of the rotation lever 51 when the rearward movement reduction mechanism 50 is operated, the rotation lever 51 functions as a tool for loosening the nut 69 when the rearward movement reduction mechanism 50 operates. Specifically, when the rotation lever 51 is rotated forward as indicated by arrow C in FIG. 14, the nut 69 is loosened. In FIG. 14, the counterclockwise direction of the arrow over the nut 69 is the direction in which the nut 69 is loosened, and the clockwise direction of the arrow is the direction in which the nut 69 is tightened. The fastening force by the bolt 68 and the nut 69 is reduced, and the rotation lever 51 is easily rotated forward. This improves the rearward movement reduction performance of the rearward movement reduction mechanism 50.

Figure 15:
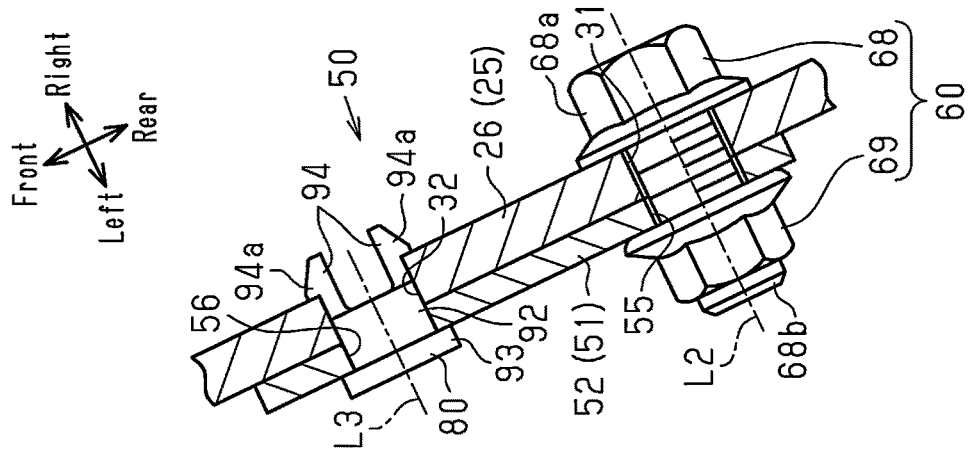
FIG. 15 is a partial cross-sectional view corresponding to FIG. 6, showing a rotation shaft and a shear portion according to a third modification.
Figure 16:
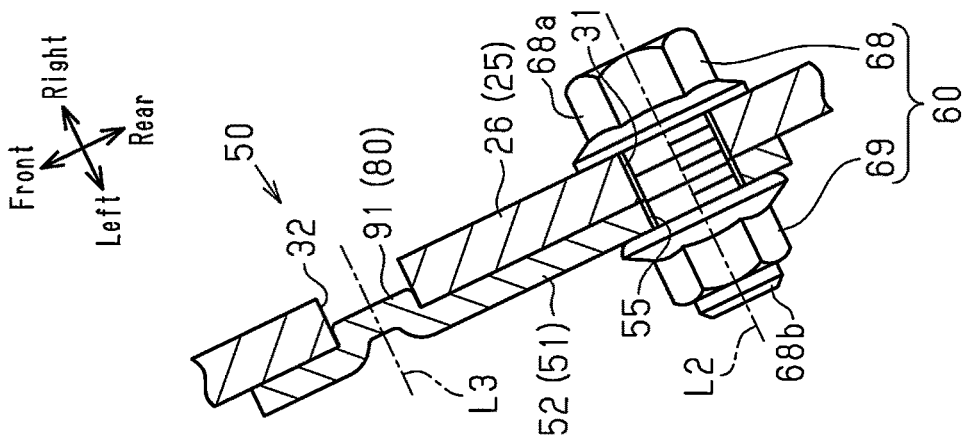
FIG. 16 is a partial cross-sectional view corresponding to FIG. 6, showing a rotation shaft and a shear portion according to a fourth modification.
Figure 17:
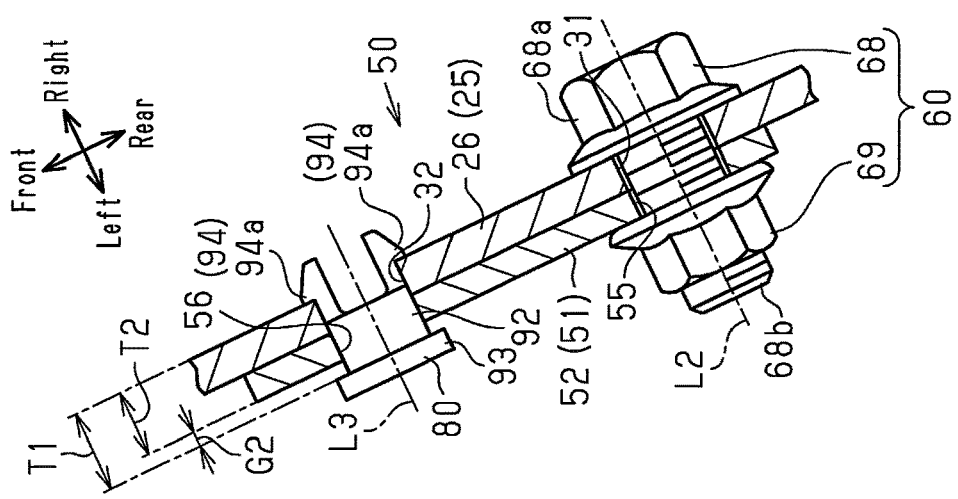
FIG. 17 is a partial cross-sectional view corresponding to FIG. 6, showing a rotation shaft and a shear portion according to a fifth modification.

The rotation shaft 60, which includes the combination of the bolt 68 and the nut 69, is also used as the rotation shaft 60 in each of the modifications shown in FIGS. 15 to 17. As shown in FIG. 13, the shear portion 80 may include a combination of a bolt 88 and a nut 89, similarly to the rotation shaft 60 in FIG. 13. In this case, the lever hole 56 is formed to have a diameter smaller than that of the arm hole 32 as in the above-described embodiment. The bolt 88 includes a head 88a, a large diameter shaft portion 88b, and a small diameter shaft portion 88c, which has a smaller diameter than the large diameter shaft portion 88b. The head 88a is disposed on the opposite side (right side) of the pedal arm 26 from the lever main body 52. The large diameter shaft portion 88b is inserted through a large portion of the arm hole 32. The small diameter shaft portion 88c is inserted through the entire lever hole 56 and a part of the arm hole 32. The nut 89 is fastened to an end of the small diameter shaft portion 88c on the side (left side) opposite to the head 88a.

As in the third modification shown in FIG. 15, the lever main body 52 may include a circular protrusion 91 that is formed by plastically deforming a part of the lever main body 52 by pressing, and the protrusion 91 may be used as the shear portion 80. The protrusion 91 is engaged with the arm hole 32. The shear portion 80 does not sandwich the lever main body 52 and the pedal arm 26 from the left and right sides. However, this does not cause any issues because the rotation shaft 60 sandwiches the lever main body 52 and the pedal arm 26 from the left and right sides.

With the third modification, since a part of the lever main body 52 functions as the shear portion 80, a separate component for fixing such as a stepped pin or a straight pin is not necessary. Further, the lever hole 56 is also unnecessary. In addition, the cost required for forming the shear portion 80 is reduced.

The protrusion 91 may have an outer shape different from a circular shape. In this case, the shape of the arm hole 32 is changed in accordance with the outer shape of the protrusion 91.

As in a fourth modification shown in FIG. 16, the shear portion 80 may be formed by plastic molding using a plastic. In this case, the arm hole 32 and the lever hole 56 are formed to have the same diameter. The shear portion 80 includes a shaft 92, a flange 93, and multiple locking lugs 94. The shaft 92 is fitted in the lever hole 56 and at least a portion of the arm hole 32 adjacent to the lever hole 56. A part of the shaft 92 is inserted into the arm hole 32. An end of the shaft 92 on the side farther from the pedal arm 26 (on the left side) is exposed from the lever hole 56. The flange 93 is formed at the exposed end, and has a larger diameter than the lever hole 56. The locking lugs 94 extend from the outer circumferential portion of the shaft 92 in a direction away from the lever main body 52 (right side) along the axis L3, and are elastically deformable in the radial direction of the shaft 92. Distal ends of the locking lugs 94 are exposed from the arm hole 32. Each locking lug 94 includes a hook 94a, which protrudes outward in the radial direction of the shaft 92, in the exposed portion. The distance between the shaft 92 and the hook 94a is less than the thickness of the pedal arm 26. The hook 94a of each locking lug 94 is locked to a peripheral portion of the arm hole 32 in the pedal arm 26.

In a case in which the rotation lever 51 is fixed to the pedal arm 26 by the shear portion 80 of the fourth modification, the shear portion 80 is inserted into the lever hole 56 and the arm hole 32 in that order with the hooks 94a at the leading end. This insertion is performed in a state in which the locking lugs 94 are elastically deformed inward in the radial direction of the shaft 92. When the shear portion 80 is inserted to a position where the hooks 94a are exposed from the arm hole 32, each of the locking lugs 94 is elastically deformed radially outward by an elastic restoring force. The hook 94a of each locking lug 94 is locked to a peripheral portion of the arm hole 32 in the pedal arm 26. In this manner, a method of fixing the rotation lever 51 to the pedal arm 26 by inserting and locking the shear portion 80 into the lever hole 56 and the arm hole 32 using the elasticity of the locking lugs 94 is also referred to as snap-fit fixing.

The fourth modification facilitates the work of fixing the rotation lever 51 to the pedal arm 26 using the shear portion 80. In addition, the fourth modification has an advantage in that the shear portion 80 can be formed at a lower cost than in a case in which an iron pin is used as the shear portion 80.

In addition, the portion of the shaft 92 that extends into the arm hole 32 is used to position the rotation lever 51 in the rotational direction around the rotation shaft 60. The shear portion 80 fixes the rotation lever 51 to the pedal arm 26 together with the rotation shaft 60 in a state in which the positioning is completed.

In a case in which the shear portion 80 is a pin made of molded plastic, the shear portion 80 can be formed with higher precision than a shear portion 80 that is a protrusion (protrusion 91) produced by pressing shown in FIG. 15. This allows for more stable positioning accuracy.

FIG. 17 shows a fifth modification, in which a pedal arm 26 with a smaller thickness than that used in FIG. 16 is employed. Even in this case, since at least a part of the shaft 92 is fitted into the arm hole 32, the positioning function is maintained. In other words, the shear portion 80 of this modification can be applied to various types of pedal arms 26 with different plate thicknesses. Therefore, it is possible to standardize the component (shear portion 80).

When the pedal arm 26 having a thickness smaller than that of FIG. 16 is used as shown in FIG. 17, a total value T2 of the thicknesses of the pedal arm 26 and the lever main body 52 is smaller than the distance T1 between the flange 93 and the hook 94a. In a state in which the pedal arm 26 is in contact with the hook 94a and the lever main body 52 is in contact with the pedal arm 26, a gap G2 is created between the lever main body 52 and the flange 93. The gap G2 allows the rotation lever 51 to move in a direction along the axis L3 of the shear portion 80. However, the movement is restricted by the flange 93.

In this case, the force with which the shear portion 80 sandwiches the lever main body 52 and the pedal arm 26 from the left and right sides is relatively small. However, this does not cause any issues because the rotation shaft 60 sandwiches the lever main body 52 and the pedal arm 26 from the left and right sides.

In addition, the strength of a plastic product is generally lower than the strength of a product made of metal such as iron. Therefore, even if the shaft 92 in the modification is made thicker (increased in diameter) than the small diameter portion 83 in the above-described embodiment (see FIG. 6), the shaft 92 can be broken by shearing or the like.

The combination of the rotation shaft 60 and the shear portion 80 in the rearward movement reduction mechanism 50 may be changed to a combination different from that used in the above-described embodiment and the modifications shown in FIGS. 12 to 17.

Other Modifications

The vehicle body structural member with which the rotation lever 51 comes into contact at the time of collision of the vehicle 10 may be the instrument panel reinforcement 13 instead of the collision bracket 14, or may be a separate member that is fixed to the instrument panel reinforcement 13 and is different from the collision bracket 14.

The input shaft 42 may be pressed from below by the pressing portion 54.

The pedal arm 26 may have a shape different from that of a pedal arm in a brake pedal device (not shown) that is not provided with the rearward movement reduction mechanism 50.

The above-described vehicle operation pedal device can be employed in a wide range of applications, such as a booster device to which the depression force of the operation pedal is transmitted. In addition to the brake pedal device 21, applicable devices include clutch pedal devices and accelerator pedal devices.

The above-described embodiments include configurations described in the following clauses.

Clause 1

A vehicle operation pedal device employed in a vehicle including a partition wall that partitions a passenger compartment from a portion of a vehicle body forward of the passenger compartment, and a vehicle body structural member disposed behind the partition wall, the vehicle operation pedal device including:
 a pedal bracket fixed to the partition wall;
 an operation pedal that includes a pedal arm rotatably supported by the pedal bracket, in which
  an input shaft of a device to which a depression force of the operation pedal is transmitted is connected to the pedal arm, and
  the operation pedal is configured such that the input shaft is moved in conjunction with rotation of the pedal arm;
 a rotation lever that
  includes a contact portion and a pressing portion,
  is supported by the pedal arm via a rotation shaft, and
  is configured to, by receiving a load greater than or equal to a threshold when the contact portion comes into contact with the vehicle body structural member at a collision of the vehicle, rotate about the rotation shaft such that the pressing portion presses the input shaft in a direction intersecting with an axis of the input shaft; and
 a shear portion that is configured to
  fix the rotation lever to the pedal arm when the load applied to the rotation lever from the vehicle body structural member is less than the threshold, and
  cancel the fixation by being broken when the load is greater than or equal to the threshold.

Clause 2

The vehicle operation pedal device according to clause 1, in which the pressing portion is disposed below the vehicle body structural member and above the input shaft.

Clause 3

The vehicle operation pedal device according to clause 1 or clause 2, in which
 a direction along an axis of the rotation shaft is a thickness direction of the rotation lever, and
 the rotation lever includes:
  a plate-shaped lever main body that is longer in a vertical direction than in a front-rear direction; and
  a rib that extends in the vertical direction along at least one of a front edge or a rear edge of the lever main body.

Clause 4

The vehicle operation pedal device according to any one of clauses 1 to 3, in which
 the pedal arm includes an arm hole,
 the rotation lever includes a lever hole having a larger diameter than the arm hole,
 the rotation shaft includes:
  a large diameter portion fitted in the lever hole;
  a small diameter portion fitted in the arm hole and fixed to the pedal arm; and
  a flange located at an end of the large diameter portion exposed from the lever hole, the flange having a larger diameter than the lever hole, and
 the flange is separated from the rotation lever in a direction away from the pedal arm.

REFERENCE SIGNS LIST

10) Vehicle
11) Passenger Compartment
12) Dash Panel (Partition Wall)
13) Instrument Panel Reinforcement (Vehicle Body Structural Member)
14) Collision Bracket (Vehicle Body Structural Member)
15) Vehicle Body
21) Brake Pedal Device (Vehicle Operation Pedal Device)
22) Pedal Bracket
25) Operation Pedal
26) Pedal Arm
31, 32) Arm Holes
40) Brake Booster (Device to which Depression Force is Transmitted)
42) Input Shaft
51) Rotation Lever
52) Lever Main Body
53) Contact Portion
54) Pressing Portion
55, 56) Lever Holes
57) Rib
60) Rotation Shaft
61) Small Diameter Portion
62) Large Diameter Portion
63) Flange
80) Shear Portion
L1, L2, L3) Axes

The invention claimed is:

1. A vehicle operation pedal device employed in a vehicle including a partition wall that partitions a passenger compartment from a portion of a vehicle body forward of the passenger compartment, and a vehicle body structural member disposed behind the partition wall, the vehicle operation pedal device comprising:
   a pedal bracket fixed to the partition wall;
   an operation pedal that includes a pedal arm rotatably supported by the pedal bracket, wherein
      an input shaft of a device to which a depression force of the operation pedal is transmitted is connected to the pedal arm, and
      the operation pedal is configured such that the input shaft is moved in conjunction with rotation of the pedal arm;
   a rotation lever that
      includes a contact portion and a pressing portion,
      is supported by the pedal arm via a rotation shaft, and
      is configured to, by receiving a load greater than or equal to a threshold when the contact portion comes into contact with the vehicle body structural member at a collision of the vehicle, rotate about the rotation shaft such that the pressing portion presses the input shaft in a direction intersecting with an axis of the input shaft; and
   a shear portion that is configured to
      fix the rotation lever to the pedal arm when the load applied to the rotation lever from the vehicle body structural member is less than the threshold, and
      cancel the fixation by being broken when the load is greater than or equal to the threshold.

2. The vehicle operation pedal device according to claim 1, wherein the pressing portion is disposed below the vehicle body structural member and above the input shaft.

3. The vehicle operation pedal device according to claim 1, wherein
   a direction along an axis of the rotation shaft is a thickness direction of the rotation lever, and
   the rotation lever includes:
      a lever main body that is longer in a vertical direction than in a front-rear direction; and
      a rib that extends in the vertical direction along at least one of a front edge or a rear edge of the lever main body.

4. The vehicle operation pedal device according to claim 1, wherein
   the pedal arm includes an arm hole,
   the rotation lever includes a lever hole having a larger diameter than the arm hole,
   the rotation shaft includes:
      a first diameter portion fitted in the lever hole;
      a second diameter portion fitted in the arm hole and fixed to the pedal arm, the first diameter portion has a larger diameter than the second diameter portion; and
      a flange located at an end of the first diameter portion exposed from the lever hole, the flange having a larger diameter than the lever hole, and
   the flange is separated from the rotation lever in a direction away from the pedal arm.

* * * * *